(12) United States Patent
Mito

(10) Patent No.: US 6,430,218 B1
(45) Date of Patent: Aug. 6, 2002

(54) COMMUNICATION CONTROL APPARATUS

(75) Inventor: Junichi Mito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/980,374

(22) Filed: Nov. 28, 1997

(30) Foreign Application Priority Data

Jun. 25, 1997 (JP) .............................................. 9-168610

(51) Int. Cl.⁷ ................................................. H04L 5/16
(52) U.S. Cl. ....................... 375/220; 375/311; 375/337; 395/200.38
(58) Field of Search ................................ 375/220, 202, 375/357; 370/294, 349, 331, 350, 337, 342, 324, 452; 395/200.38, 200.58; 714/800; 710/10, 34

(56) References Cited

U.S. PATENT DOCUMENTS

| | | | | |
|---|---|---|---|---|
| 5,278,848 A | * | 1/1994 | Yamaguchi | 714/800 |
| 5,361,260 A | * | 11/1994 | Mito | 370/452 |
| 5,488,693 A | * | 1/1996 | Houck et al. | 395/200.38 |
| 5,677,908 A | * | 10/1997 | Oura | 370/331 |
| 5,822,361 A | * | 10/1998 | Nakamura et al. | 375/202 |
| 5,896,509 A | * | 4/1999 | Sugimoto | 395/200.58 |

FOREIGN PATENT DOCUMENTS

| | | |
|---|---|---|
| JP | 61-177047 | 8/1986 |
| JP | 63-088933 | 4/1988 |
| JP | 01-298834 | 12/1989 |
| JP | 02-117238 | 5/1990 |
| JP | 03-088446 | 4/1991 |
| JP | 04-020143 | 1/1992 |
| JP | 04-138737 | 5/1992 |

* cited by examiner

Primary Examiner—Stephen Chin
Assistant Examiner—Shuwang Liu
(74) Attorney, Agent, or Firm—Sughrue Mion, PLLC

(57) ABSTRACT

In a communication control apparatus in which the master station transmits a batch transmission frame to a plurality of slave stations and individual response frames are transmitted from the respective slave stations to the master station, the master station previously transmits the batch transmission frame containing the transmission order designation of the slave stations. When each of these slave stations responds to the slave station, the slave stations successively and continuously transmit the response frames to the master station based upon the transmission order designation transmitted from the master station every time the response frame transmission by the slave station prior to the own slave station is accomplished.

7 Claims, 8 Drawing Sheets

FIG. 6

| SLAVE APPARATUS STATION NUMBER | TRANSMISSION ORDER DESIGNATION |
|---|---|
| 01 | 03 |
| 02 | 04 |
| 03   ** | 01 |
| 05 | 05 |
| 04 | 02 |
| 06 | 06 |

** : SLAVE STATION WHOSE TERMINATOR IS DETECTED, AND TRANSMISSION ORDER IS FIRST SET

COMMUNICATION CONTROL APPARATUS

BACKGROUND OF THE INVENTION

1. Field of the Invention

The present invention relates to a communication control apparatus for connecting a plurality of slave stations to a master station via a communication network so as to transfer data between the master station and the plural slave stations, in which the plural slave stations are arranged by a servo amplifier control apparatus for controlling a servo motor and a main shaft motor, and by a main shaft amplifier control apparatus, whereas the master station is arranged by a numerical control apparatus.

2. Description of the Related Art

In the conventional communication control apparatus, the following communication control method has been introduced. That is, a single master station is provided with respect to a plurality of slave stations. To synchronize a plurality of slave stations with the single master station, the batch transmission frame is transmitted in the batch mode from the master station to the plural slave stations, and then the slave stations which receive this batch transmission frame can be synchronized with the master station.

In other words, the control timing of the respective servo amplifiers is synchronized with the control timing of the main shaft amplifier in response to the communication start code of the batch transmission frame transmitted from the master station. Based upon the synchronized reference timer, the slave stations start the transmissions to the master station at different timing with respect to the ID numbers of the respective slave stations.

Such a conventional communication control apparatus is described in, for example, Japanese Laid-open Patent Application No. 4-293338 opened in 1992.

In the above-explained conventional communication control apparatus, the very precise timing controls could not be performed, but very lengthy time periods are necessarily required in order that the master station receives the frames transmitted from all of these slave stations. The reason why such very precise timing controls could not be realized is given as follows: Upon sensing the batch transmission frame sent from the master station, each of these slave stations resets the timing synchronizing counter employed in the own slave station. When the count value of this timing synthesizing counter reaches a certain defined value (the defined values are different from each other in the respective slave stations), the slave station produces the transmission initiation signal used to transmit the frame to the master station. If the very precise transmission initiation timing is determined, then the circuit scale of the comparators for comparing the defined values and the counter values of the timing synchronizing counters is increased. As a consequence, there is a problem that the circuit scales of the slave stations are increased. This solution could not be practically accepted.

SUMMARY OF THE INVENTION

The present invention has been made to solve the above-explained problem, and therefore, has an object to provide such a communication control apparatus capable of shortening idle time during which each of slave stations does not perform a transmission to a master station in order to achieve a maximum transfer efficiency within a limited bandwidth of a network used to connect the master station to a plurality of slave stations based upon such a judgement that the shorter the response time from the plural slave stations to the master station becomes, the better the communication control can be realized.

In a communication control apparatus, according to an aspect of the present invention, in which a batch transmission frame is transmitted in a batch mode from a master station to a plurality of slave stations, and individual response frames are transmitted from the respective slave stations to the master station, when a batch transmission frame containing a transmission order designation of the slave stations from the master station is previously transmitted, and also the respective slave stations respond to the master station, response frames are successively transmitted in a continuous manner to the master station based upon the transmission order designation transmitted from the master station every time the transmission of the response frame by the slave station prior to the own slave station is completed.

Also, according to the communication control apparatus of the present invention, the response frame transmission from the slave station to the master station is switched at specific timing based upon reference counters provided within the slave stations, the timing phases of which are made coincident with timing phase of the master station, and also a station number of a predetermined slave station.

Also, according to the communication control apparatus of the present invention, the master station previously makes a recognition as to which slave station is connected to a network by executing an initialization communication.

Also, according to the communication control apparatus of the present invention, when the transmission is carried out from the slave stations to the master station, the master station executes the transmission order designation in such a manner that a confirmation is made as to whether or not a terminator indicative of a final end of a daisy chain connection is connected to which slave station based on the transmission frame transmitted by the slave station, and the transmission is commenced by such a slave station which is connected to the final end separated from the master station by the farthest distance.

Also, according to the communication control apparatus of the present invention, while utilizing shortening of the transmission time from a plurality of slave stations to the master station, the master station shortens an interval for producing an interrupt signal to a microcomputer for executing a data process operation in the master station in order to shorten a series of communication cycle between the master station and the plural slave stations.

Also, according to the communication control apparatus of the present invention, transmission start timing of such a slave station which firstly executes a frame transmission to the master station is commenced in predetermined offset time based upon a timing synchronizing counter which is synchronized with the batch transmission frame from the master station to the plurality of slave stations.

Furthermore, according to the communication control apparatus of the present invention, transmission start timing of such a slave station which firstly executes a frame transmission to the master station is commenced in predetermined offset time designated by data contained in a transmission order designation from the master station to the slave stations based upon a timing synchronizing counter which is synchronized with the batch transmission frame from the master station to the plurality of slave stations.

The above and other objects and features of the present invention will be more apparent from the following description taken in conjunction with the accompanying drawing.

BRIEF DESCRIPTION OF THE DRAWINGS

FIG. 6 is a structural diagram for showing transmission order designation data;

DETAILED DESCRIPTION OF THE PREFERRED EMBODIMENTS

Now, a description will be given in more detail of a preferred embodiment of the invention with reference to the accompanying drawings.

Figure 1:
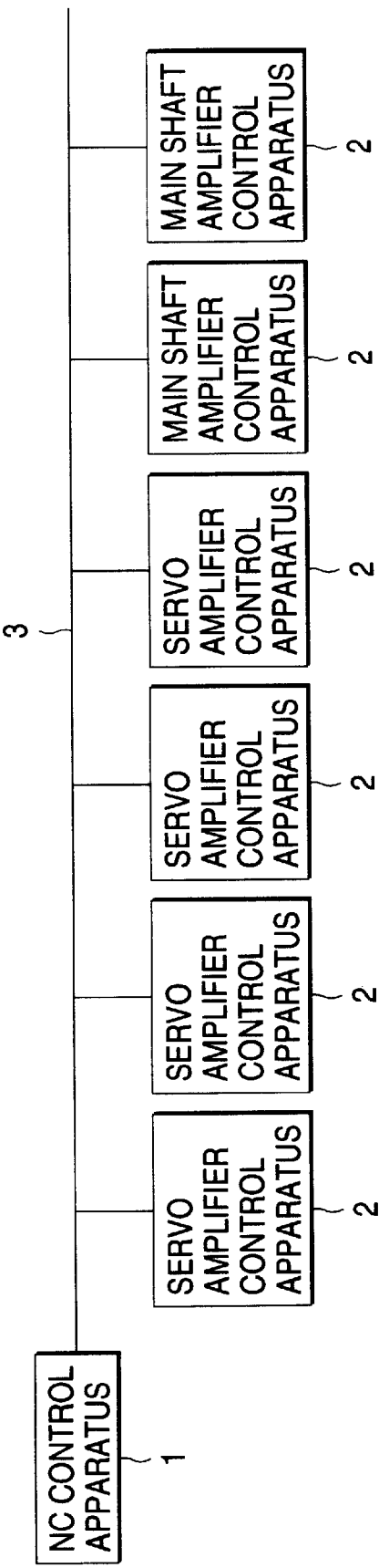
FIG. 1 is a system structure diagram of a communication control apparatus for representing an embodiment of the present invention.
Figure 2:
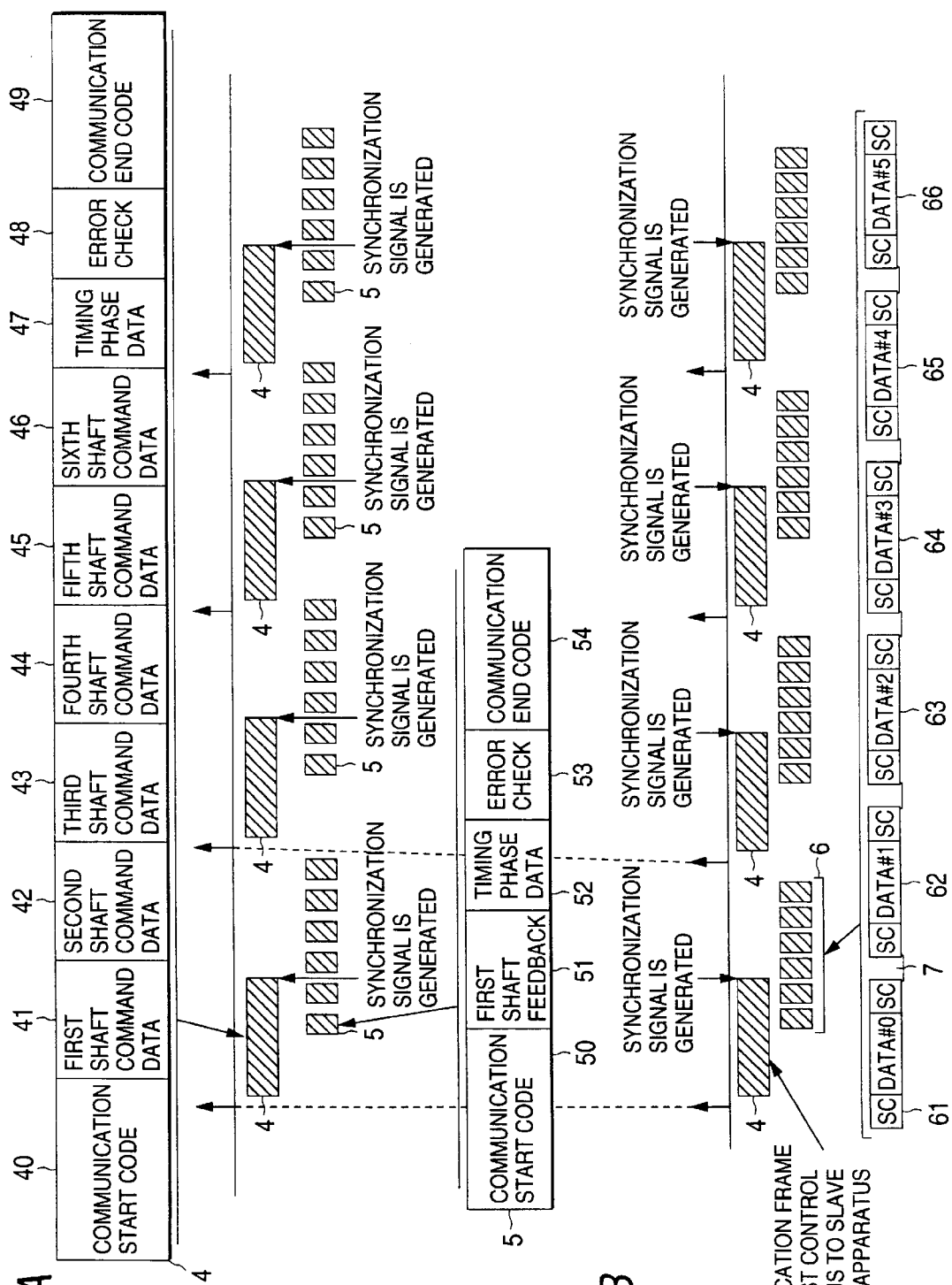
FIGS. 2A and 2B are explanatory diagrams for indicating a communication control system.

FIG. 1 shows a system structural diagram of a communication control apparatus according to an embodiment of the present invention. FIG. 2 is an explanatory diagram for explaining a communication control system of this communication control apparatus. In FIG. 1, reference numeral 1 indicates a master station constructed of a numerical value control (NC) apparatus; reference numeral 2 shows a plurality of slave stations arranged by a plurality of servo amplifier control apparatus, and a plurality of main shaft amplifier control apparatus, and reference numeral 3 represents a communication network for connecting the master station 1 to a plurality of slave stations 2.

As an explanation of the communication control system, FIGS. 2A and 2B indicate timing at which actual communications are carried out from the master station to the slave stations, and also from the slave stations to the master station, and further structural contents of the respective communication frames. FIG. 2A indicates an initialization communication mode, and FIG. 2B represents a highspeed cycle execution mode. In the drawing, reference numeral 4 is a batch transmission frame which is transmitted from the master station 1 to all of the slave stations 2. This batch transmission frame 4 contains a communication start code 40, first shaft command data 41 through sixth shaft command data 46, timing phase data 47, error check data 48, and a communication end code 49 in this order from a top (head). Reference numeral 5 denotes an individual response frame transmitted from each of the slave stations to the master station 1 during the initialization communication mode. This individual response frame 5 contains a communication start code 50, a first shaft feedback 51, timing phase data 52, an error check 53, and a communication end code 54 in this order from a top. In such a case of the individual response frames transmitted from other slave stations than this slave station, the frames from the top frame to the second frame become the second shaft feedback to the sixth shaft feedback. Reference numeral 6 is an individual response frame transmitted from each of the slave stations 2 to the master station 1 in the highspeed cycle execution mode, and becomes a first return frame 61 to a sixth return frame 66 in this order from a top. Reference numeral 7 shows communication frame margin time indicative of an interval between the respective return frames, and is set by a delay circuit 510 of each of the slave stations 2.

In the above-described initialization communication mode, similar to the conventional communication control system, the communication is commenced, and then the master station 1 acquires information for indicating which slave station 2 is connected to this master station 1 based on the ID data contained in the response frame 5 transmitted from each of the slave station 2 to the master station 1.

Next, the master station 1 transmits such a transmission frame containing a data table used to designate the transmission order of the respective slave stations 2 in the batch transmission frame 4. Upon receipt of this transmission frame, the respective slave stations 2 set such a condition that after having received a frame containing ID information of the slave station 2, which is transmitted before the frame transmission of the current slave station, the current slave station starts its frame transmission.

In the above-described highspeed cycle execution mode, the frame communications sent from the respective slave stations 2 are carried out without any interruption, so that the time required to transmit the response frames from the plural slave stations to the master station is shortened. In this case, the transmission start timing of the slave station 2 which first starts the transmission to the master station 1 may be equal to predetermined timing, or such a method designated by the data contained in the frame for designating the above-described transmission sequence. In any cases, the frame transmission is commenced at the timing defined based on the timing synchronizing counter reset by the batch transmission frame sent from the master station 1.

When the top (head) transmission frame (first return frame) is transmitted from the first slave station 2 to the master station 1, other slave stations 2 successively commence the frame transmissions since the frame transmissions by the preceding slave stations are accomplished. As a consequence, the overall communication response time required from the plural slave stations to the master station 1 can be shortened.

In this case, since the master station 1 can predict the time required to transmit all of the response frames 6 from the plural slave stations 2, the communication cycle between the master station 1 and the slave stations 2 can be set to be shortened.

As a means for shortening the communication cycle, the interval for producing the interrupt signal used to a microcomputer employed in the master station 1 is shortened so as to process the data by the microcomputer employed in the master station 1. However, in the actual case, the microcomputer provided in the master station sets the interrupt period in such a way that the interval for producing the interrupt signal is shortened within a data processing capable range by the microcomputer employed in the master station, taking account of the factor of the communication time.

Also, since the maximum station number of the slave stations connected to a single network is limited not only by the bandwidth of the network, but also by the reception buffer capacity provided in the master station and used to store the data transmitted from the slave stations, the maximum station number for the original system is determined. As a consequence, when the slave stations are connected to a single network, it may be possible that the order of the IDs is changed, and a total station number of the slave stations is smaller than the maximum station number. Since the maximum station number of the slave stations is determined, the software processing operation executed in the master station for scanning the reception buffer for receiving a plurality of frames sent from the slave stations can be made easy.

Figure 3:
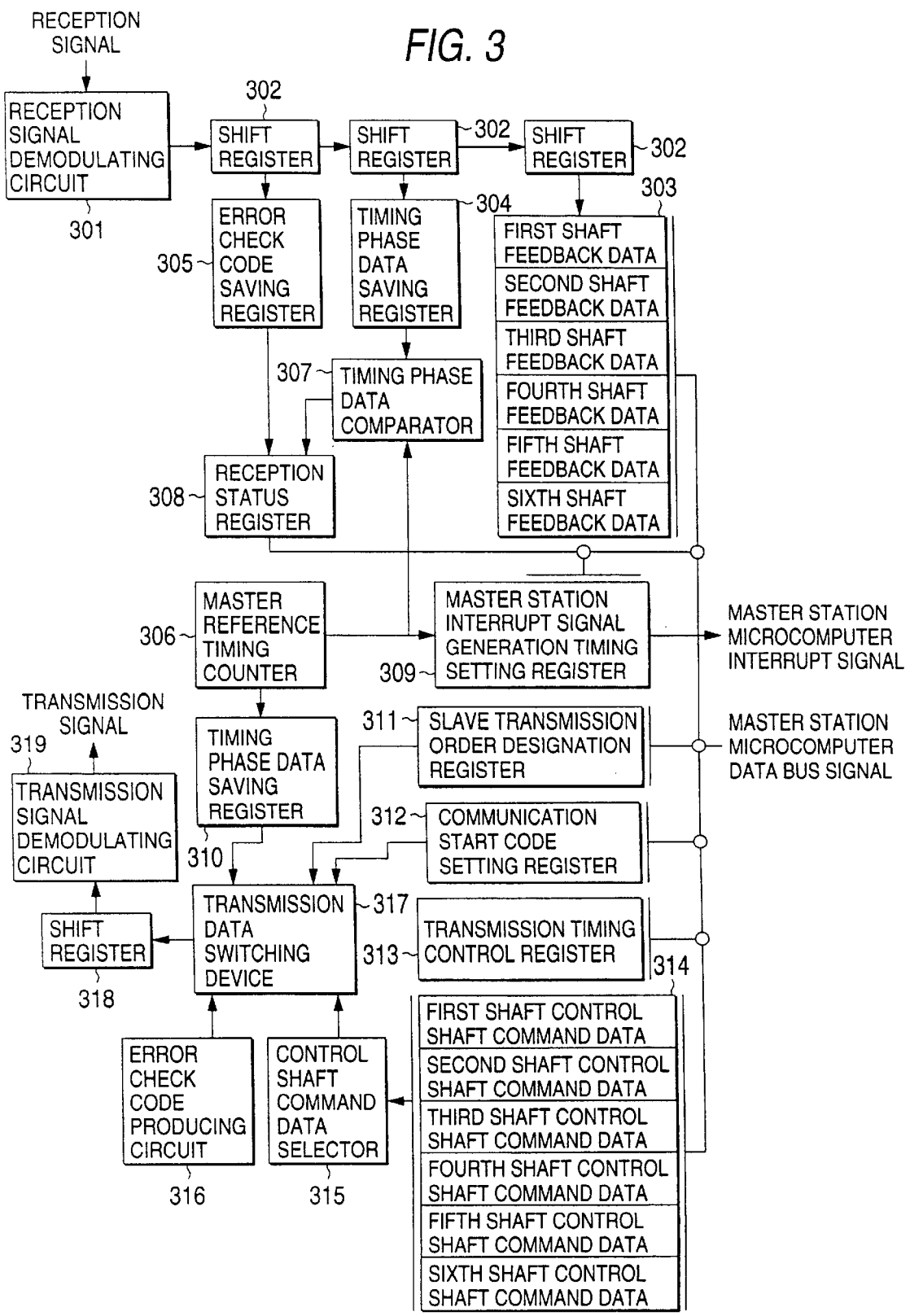
FIG. 3 is a structural diagram for indicating a transmitting/receiving circuit of a master station.

FIG. 3 is a structural diagram for showing a transmitting/receiving circuit of the master station 1 according to the embodiment of the present invention. In this drawing, reference numeral 301 shows a demodulating circuit of a reception signal; reference numeral 302 indicates a reception shift register; reference numeral 303 represents a control shaft feedback data storage region; reference numeral 304 denotes a timing phase data saving register for saving timing phase data sent from the slave station 2; and reference numeral 305 is an error check code saving register for saving an error check code of a reception frame. Also, reference numeral 306 shows a master reference timing counter for counting reference timing of the master station 1; reference numeral 307 indicates a timing phase data comparator for comparing the timing phase of the timing phase data saving register 304 with the timing phase of the master reference timing counter 306; and reference numeral 308 is a reception status register. Reference numeral 309 is a master station interrupt signal generation timing setting register for setting the generation timing of the interrupt signal with respect to the microcomputer employed in the master station based on the timing phase sent from the master reference timing counter 306; reference numeral 310 shows a timing phase data saving register used when the timing phase data is transmitted to the slave station; reference numeral 311 denotes a slave transmission sequence designation register for storing a slave transmission sequence transmitted from the master station to all of the slave stations; reference numeral 312 is a communication start code setting register for setting various sorts of communication start codes transmitted from the master station to the slave stations; reference numeral 313 denotes a transmission timing control register for setting the transmission timing to the slave station; reference numeral 314 is a control shaft command data storage region used when the control shaft command data is transmitted to the slave station; and reference numeral 315 denotes a control shaft command data selector for selectively switching the data of this control shaft command data storage region 314. Also, reference numeral 316 denotes an error check code producing circuit for producing an error check code during the transmission operation; reference numeral 317 represents a transmission data switching device for switching the transmission data of the timing phase data saving register 310, the slave transmission order designation register 311, the communication start code setting register 312, the control shaft command data selector 315, and the error check code producing circuit 316; and reference numeral 318 is a transmission shift register; and further reference numeral 319 denotes a transmission signal modulating circuit for modulating the transmission signal derived from the transmission shift register 318.

Figure 4:
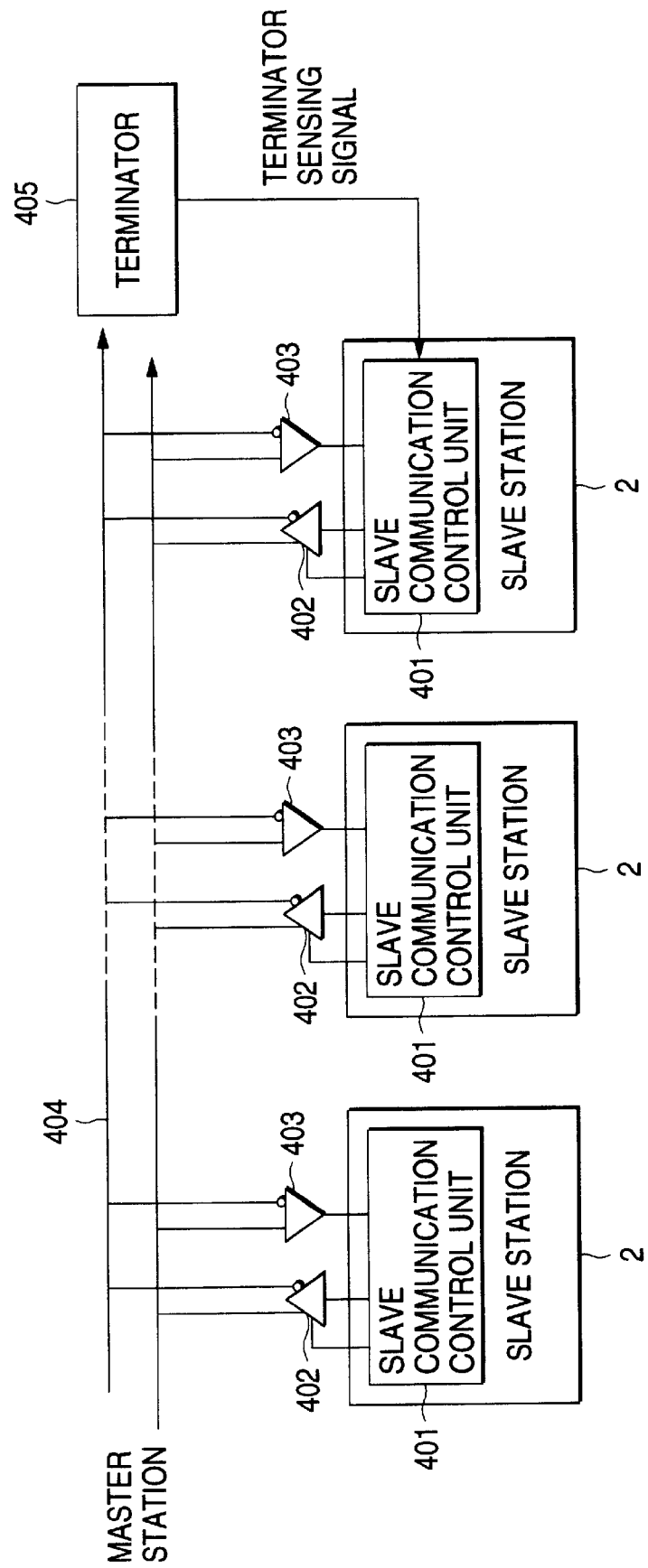
FIG. 4 is a schematic structural diagram for showing a transmitting/receiving circuit between the master station and a plurality of slave stations.

FIG. 4 schematically shows an arrangement of transmitting/receiving circuits between the master station and the plural slave stations according to the embodiment of the present invention. In this drawing, reference numeral 401 is a slave communication control circuit contained in the slave station 2, reference numeral 402 indicates a transmission driver of the slave station 2, reference numeral 403 represents a reception receiver of the slave station 2, reference numeral 404 indicates a daisy chain connection network for connecting the master station to the plural slave stations 2, and reference numeral 405 is a terminator functioning as a terminal circuit of the daisy chain connection network 404.

Since the respective slave stations 2 are connected to the same daisy chain connection network, each of these slave stations 2 can receive the frame from the master station 1 and also the frames from other slave stations 2. Since the initialization communication mode is utilized, each of the slave stations is designated by the transmission order designation data sent from the master station in response to such an instruction that the current slave station should transmit at a predetermined transmission order. The final slave station in the daisy chain connection network may recognize that the own station corresponds to the final station by using a sensing signal of the terminator 405, and transmits to the master station such a message that the own slave station is connected to the terminator. The master station firstly instructs that the transmission to the master station is commenced in response to the transmission order designation data. In this case, each of the slave stations can recognize the transmission order at which the current slave station should transmit, and also such a slave station which will transmit just before the current slave station. This slave station which will transmit just before the own slave station will transmit will be referred to as a "lower grade slave" hereinafter.

Figure 5:
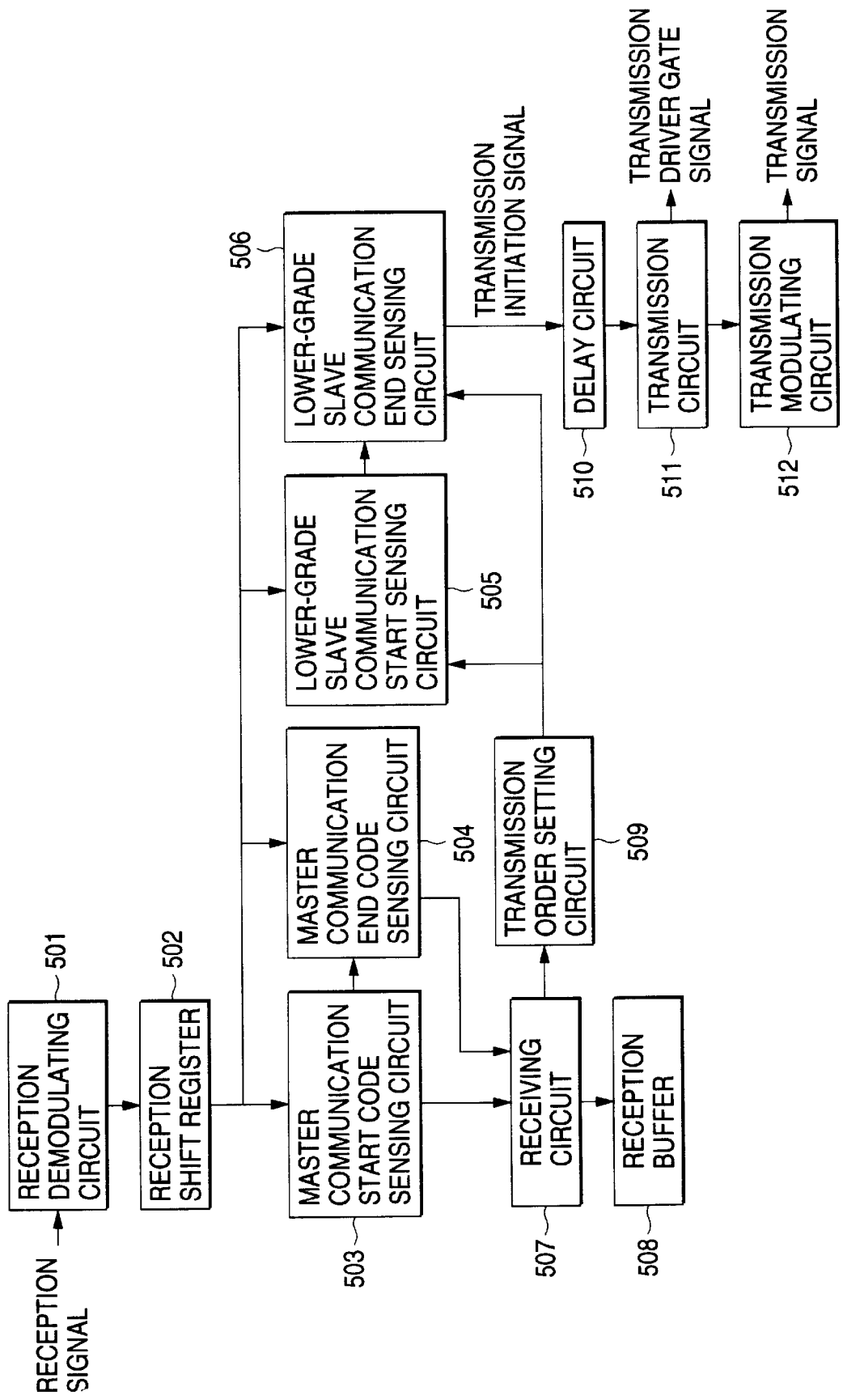
FIG. 5 is a structural diagram for indicating a transmitting/receiving circuit of each of the slave stations.

FIG. 5 is a structural diagram for showing a transmitting/receiving circuit of the slave station according to the embodiment of the present invention. In this drawing, reference numeral 501 is a reception demodulating circuit for demodulating a transmission signal transmitted from the master station, or another slave station; reference numeral 502 is a reception shift register for receiving the signal outputted from this reception demodulating circuit 501; reference numeral 503 is a master communication start code sensing circuit for sensing a communication start from the master station; reference numeral 504 is a master communication end code sensing circuit for sensing a communication end derived from the master station; reference numeral 506 shows a lower-grade slave communication sensing circuit for sensing a communication end of the lower grate slave; and reference numeral 507 indicates a receiving circuit for receiving the communication data derived from the master station; reference numeral 508 is a reception buffer for storing the data received by this receiving circuit 507; and reference numeral 509 denotes a transmission order setting circuit for setting a transmission order of an own station by receiving the transmission order designation data sent from the master station. Also, reference numeral 510 is a delay circuit for producing a delay signal defined by receiving a transmission initiation signal from the lower-grade slave communication end sensing circuit 506 and then by commencing the transmission of the own station. The communication frame margin time 7 shown in FIG. 2B is set by this delay circuit 510. Reference numeral 511 is a transmitting circuit for executing a transmission upon receipt of the delay signal from the delay circuit 510, and reference numeral 512 shows a transmission modulating circuit for modulating the transmission signal sent from this transmitting circuit 511. In this case, the lower-grade slave station indicates that the transmission order to the master station is equal to the one-preceding slave station. A means for recognizing the communication end of the one-preceding slave station corresponds to the lower-grade slave communication sensing circuit 505 and the lower-grade slave communication end sensing circuit 506.

FIG. 6 is a structural diagram for indicating the transmission order designation data used to designate the transmission order of the plural slave stations from the master station. This transmission order designation data is transmitted from the master station to all of the slave stations in the highspeed cycle initialization mode from the master station.

Figure 7:
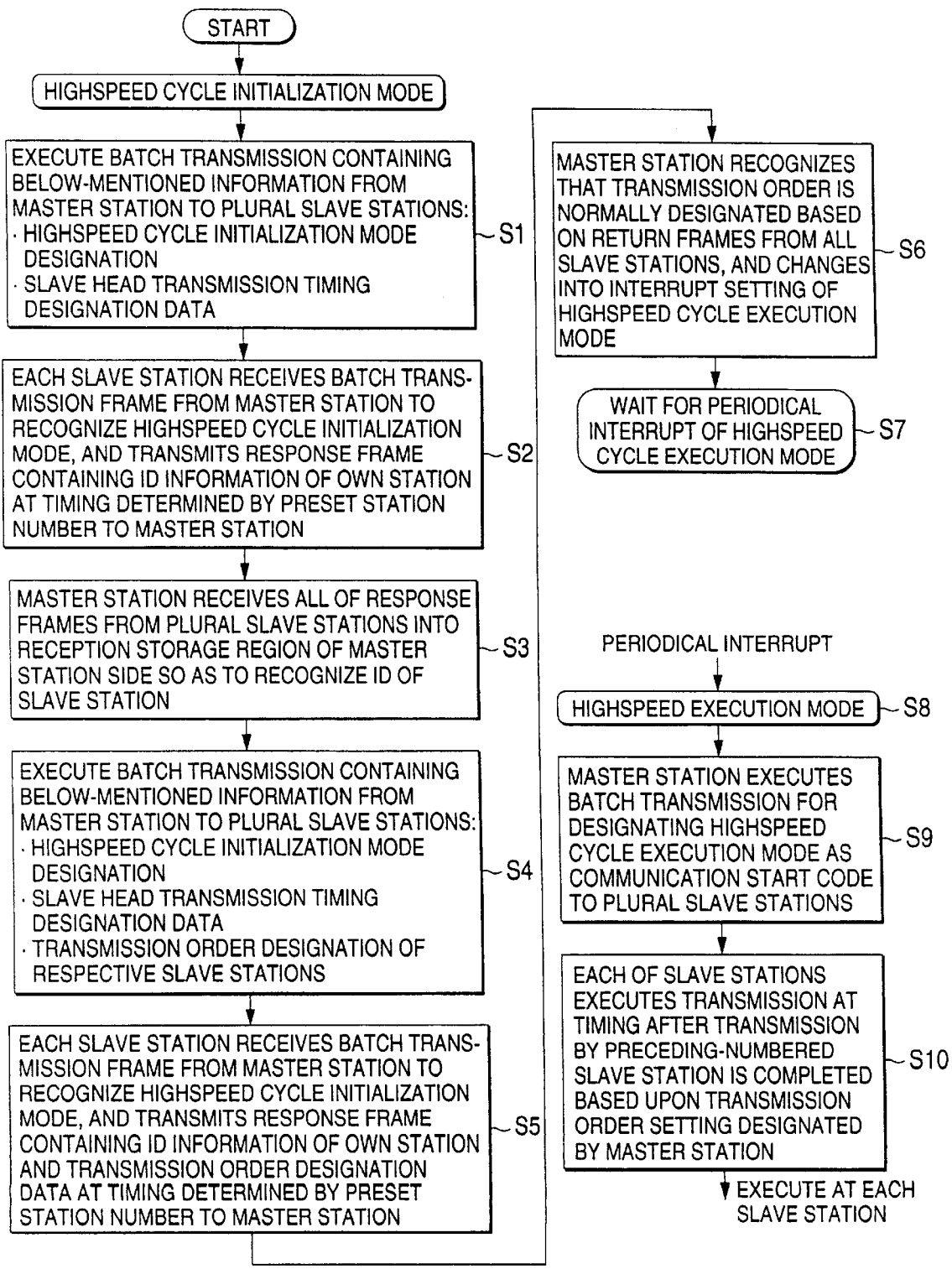
FIG. 7 is an operation flow chart for indicating a highspeed cycle initialization mode and a highspeed cycle execution mode.

FIG. 7 is an operation flow chart for representing the highspeed cycle initialization mode and the highspeed cycle execution mode of the communication control apparatus according to the present invention. At a step S1, information containing the highspeed cycle initialization mode designation and the slave top (head) transmission timing designation data is transmitted as a batch transmission frame from the master station to a plurality of slave stations. Upon receipt of this batch transmission frame, the timing phases of the slave stations can be synchronized. Since the ID recognition of the slave station has not yet been completed at this step S1, the transmission order designation is not yet completed. At a step S2, each of the slave stations receives the batch transmission frame sent from the master station so as to recognize that the present mode is the highspeed cycle initialization mode, and then transmits the response frame containing the ID information of the own station at timing predetermined by a preset station number. At a step S3, in the master station, the all response frames transmitted from the plural slave stations are received into the reception storage region provided on the side of the master so as to recognize the IDs of the slave stations. At a step S4, the master station transmits as a batch transmission frame, such information containing the highspeed cycle initialization mode designation, the slave top transmission timing designation data, and the transmission order designation of the respective slave stations to a plurality of slave stations. At this step S4, the formal transmission order designation data is transmitted. At a step S5, each of the slave stations receives the batch transmission frame transmitted from the master station so as to recognize that the present mode is the highspeed cycle initialization mode, and transmits the response frame containing the ID information of the current slave station and the transmission order designation data of the current slave station to the master station at timing predetermined by a preset station number. At a step S6, the master station recognizes that the transmission order can be designated under normal state by the return frames sent from all of the slave stations, and changes the operation mode into the interrupt setting operation of the highspeed cycle execution mode. At a step S7, the operation status is brought into such a states for periodically waiting for the interrupt of the highspeed cycle execution mode. When the periodic interrupt of the highspeed cycle execution mode is received at a step S8, the master station transmits a batch transmission frame for designating the highspeed cycle execution mode as a communication start code to the plural slave stations at a step S9. At a step S10, when the preceding-numbered (lower grade) slave station commences the frame transmission based on the transmission order designation designated by the master station, the slave stations successively execute the frame transmissions at timing after this frame transmission is accomplished. Eventually, the entire transmissions by the plural slave stations can be accomplished within start time period.

Figure 8:
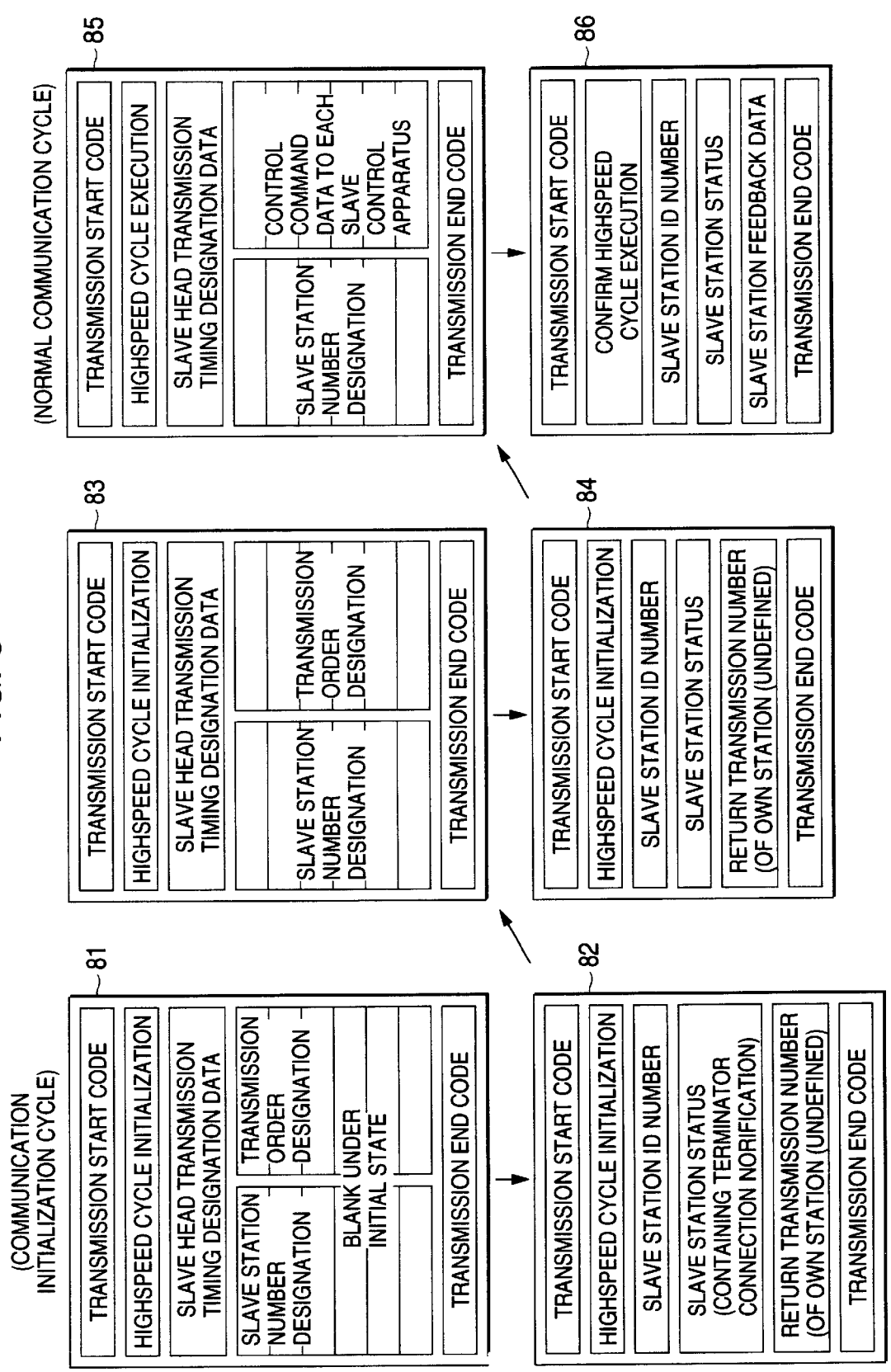
FIG. 8 is an explanatory diagram for indicating structures of a transmission frame and also of a return frame in a communication initialization cycle and a normal communication cycle.

FIG. 8 is an explanatory diagram for explaining structures of transmission frames and return frames in the communication initialization cycle and the normal communication cycle of the communication control apparatus according to this invention. In FIG. 8, an upper stage indicates a structure of a transmission frame sent from the master station to the plural slave stations, and a lower stage represents a structure of a return frame sent from each of the slave stations to the master station.

In this drawing, a first transmission frame 81 of the communication initialization cycle corresponds to the state defined at the step S1 in FIG. 7, and contains the transmission start code, the highspeed cycle initialization, the slave top transmission timing designation data, and the transmission end code. This first transmission frame 81 is transmitted from the master station to the plural slave stations. At this time, a slave station number designation and a transmission order designation are under blank state. The slave station which firstly commences the transmission to the master station in response to the above-described slave top transmission timing designation data determines the transmission start timing. In other words, this slave station delays the transmission timing only by the offset data designated in this case based upon the counter operated in synchronism with the batch transmission frame sent from the master station.

Subsequently, a return frame 82 returned from each of the slave stations to the master station corresponds to the condition defined at the step S2 in FIG. 7, and contains a transmission start code, a highspeed cycle confirmation, the ID number and the status of the slave station, the transmission number return (undefined) of the current slave station, and the transmission end code. The status of the above-described slave station notifies such a slave station to which the terminator of the daisy chain is connected with respect to the master station.

Then, the master station confirms the ID numbers of all of the connected slave stations, and thereafter transmits a transmission frame 83 which has been changed into the data containing the transmission order designation of all of the slave stations. At this time, the slave station number is designated and the transmission order is designated, which correspond to the condition of the step S4 in FIG. 7.

Then, in each of the slave stations, a return frame 84 containing a return of a defined transmission number by an current state station is transmitted. This condition corresponds to the state of the step S5 in FIG. 7. The master station confirms that the transmission order of all of the slave stations could be defined. This state corresponds to the conditions defined at the steps S6 and S7 in FIG. 7.

When the above-described initialization mode is advanced to the execution mode, a first transmission frame 85 in the normal communication cycle corresponds to the condition of the step S9 in FIG. 7. This first transmission frame 85 contains the transmission start code, the highspeed cycle execution, the slave top transmission timing designation data, the slave station number designation, the control command data for the respective slave stations, and the transmission end code. This first transmission frame 85 is transmitted as the batch transmission frame from the master station to the plural slave stations.

Next, a return frame 86 returned from each of the slave stations to the master station is transmitted as a return frame containing slave station feedback data.

Since the present invention is arranged in the above-described manner, the below-mentioned effects can be achieved.

The master station transmits the batch transmission frame containing the transmission order designation of the respective slave stations, and each of the slave stations which receives this batch transmission frame may successively and continuously transmit the response frame to the master station every time the response frame transmission of the preceding slave station with respect to the own slave station is completed. As a result, the idle time during which the transmission is not carried out can be shortened.

Also, the overall communication response time from a plurality of slave stations to the master station can be shortened.

Since the master station can predict the time required to transmit all of the response frames from the plural slave stations, it is possible to reduce the communication cycle between the master station and the plural slave stations.

Also, in order to reduce the communication cycle, the time interval for generating the interrupt signal with respect to the microcomputer employed in the master station is shortened, so that the data can be processed by the microcomputer employed in the master station within a short time.

Also, the interrupt period is set based upon the data processing capability by the microcomputer provided in the master station in such a way that the time interval for generating the interrupt signal can be shortened within the data processable range. As a consequence, the data processing capabilities by the microcomputer can be firmly realized.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A communication control apparatus comprising:
    a plurality of slave stations; and
    a master station which transmits a batch transmission frame in a batch mode to said plurality of slave stations, wherein
        individual response frames are transmitted from the respective slave stations to the master station,
        the batch transmission frame containing a transmission order designation of the slave stations from the master station is initially transmitted to the slave stations,
        the respective slave stations respond to the master station, and
        response frames are successively transmitted in a continuous manner to the master station based upon the transmission order designation transmitted from the master station after the transmission of the response frame by a previous slave station is completed.

2. A communication control apparatus as claimed in claim 1 wherein:
    the response frame transmission from the slave station to the master station is switched at specific timing based upon reference counters provided within the slave stations, timing phases of the slave stations are made coincident with timing phase of said master station, and also a station number of a predetermined slave station.

3. A communication control apparatus as claimed in claim 2 wherein:
    said master station previously makes a recognition as to which slave station is connected to a network by executing an initialization communication.

4. A communication control apparatus as claimed in claim 1 wherein:
    when the transmission is carried out from the slave stations to the master station, the master station executes the transmission order designation in such a manner that a confirmation is made as to whether or not a terminator indicative of a final end of a daisy chain connection is connected to which slave station based on the transmission frame transmitted by the slave station, and the transmission is commenced by such a slave station which is connected to the final end separated from the master station by the farthest distance.

5. A communication control apparatus as claimed in claim 1 wherein:
    while utilizing shortening of the transmission time from the plurality of slave stations to the master station, the master station shortens an interval for producing an interrupt signal to a microcomputer for executing a data process operation in the master station in order to shorten a series of communication cycles between the master station and the plural slave stations.

6. A communication control apparatus as claimed in claim 1, wherein:
    transmission start timing of a slave station which firstly executes a frame transmission to the master station is commenced in a predetermined offset time based upon a timing synchronizing counter which is synchronized with the batch transmission frame from the master station to said plurality of slave stations.

7. A communication control apparatus as claimed in claim 1, wherein:
    transmission start timing of a slave station which firstly executes a frame transmission to the master station is commenced in a predetermined offset time designated by data contained in a transmission order designation from the master station to the slave stations based upon a timing synchronizing counter which is synchronized with the batch transmission frame from the master station to said plurality of slave stations.

* * * * *